United States Patent [19]

Bovenkerk et al.

[11] Patent Number: 4,536,442
[45] Date of Patent: Aug. 20, 1985

[54] PROCESS FOR MAKING DIAMOND AND CUBIC BORON NITRIDE COMPACTS

[75] Inventors: Harold P. Bovenkerk; Paul D. Gigl, both of Worthington; Francis R. Corrigan, Westerville, all of Ohio

[73] Assignee: General Electric Company, Worthington, Ohio

[21] Appl. No.: 488,003

[22] Filed: May 2, 1983

Related U.S. Application Data

[63] Continuation of Ser. No. 69,204, Aug. 23, 1979, abandoned.

[51] Int. Cl.³ .............................................. B32B 5/16
[52] U.S. Cl. ................................. 428/323; 428/408; 350/1.1; 423/446
[58] Field of Search ............... 428/408, 698; 264/1.2, 264/125, 60; 350/319, 1.1; 423/290, 446

[56] References Cited

U.S. PATENT DOCUMENTS

| | | | |
|---|---|---|---|
| 3,312,759 | 4/1967 | Setter | 350/1.1 |
| 3,829,544 | 8/1974 | Hall | 264/125 |
| 3,876,751 | 4/1975 | Alexeevsky et al. | 423/290 |
| 4,104,441 | 8/1978 | Fedoseev et al. | 428/408 |
| 4,110,084 | 8/1978 | Lee et al. | 264/60 |
| 4,132,554 | 1/1979 | Saito et al. | 106/55 |
| 4,148,894 | 4/1979 | Hillig et al. | 428/244 |
| 4,148,964 | 4/1979 | Fedoseev et al. | 428/408 |
| 4,150,098 | 4/1979 | Sirota et al. | 423/290 |
| 4,171,400 | 10/1979 | Rosette et al. | 350/1.1 |
| 4,188,194 | 2/1980 | Corrigan | 51/307 |
| 4,217,318 | 8/1980 | Anderson | 264/1.2 |
| 4,220,455 | 9/1980 | St. Pierre et al. | 264/60 |
| 4,220,677 | 9/1980 | Fedoseev et al. | 427/249 |
| 4,231,762 | 11/1980 | Hara et al. | 51/309 |
| 4,241,135 | 12/1980 | Lee et al. | 428/408 |
| 4,242,106 | 12/1980 | Morelock | 264/60 |
| 4,248,606 | 2/1981 | Bovenkerk | 51/307 |
| 4,260,397 | 4/1981 | Bovenkerk | 51/307 |
| 4,289,503 | 9/1981 | Corrigan | 51/307 |

FOREIGN PATENT DOCUMENTS

2400046 10/1975 Fed. Rep. of Germany.
2533743 10/1977 Fed. Rep. of Germany.

OTHER PUBLICATIONS

Hall et al., Erosion Hardened Nose Tips for Improved Accuracy Re-Entry Vehicles 7/23/76.
Corrigan & Bundy "Direct Transitions Among the Allotropic Forms of Boron Nitride at High Pressure and Temperature", *The Journal of Chemical Physics* vol. 63, No. 9, 11/1/75, pp. 3812–3820.
Sluck, G. A., "Advanced Materials for Optical Windows", *General Electric Technical Information Series*, Jun. 1979.
*High-Pressure Science* and Technology, vol. 2, ed. Timmerhaus, K. D. and Barber, M. S. pp. 549–558.
Electric Company, Re-Entry and Environmental Systems Division, Philadelphia, Pa. 19101.

*Primary Examiner*—George F. Lesmes
*Assistant Examiner*—William M. Atkinson
*Attorney, Agent, or Firm*—Robert R. Schroeder; Douglas B. Little

[57] ABSTRACT

Optical windows for hostile environments have been made from diamond and adamantine boron nitride compacts. The compact windows can comprise a single layer of large crystals bonded in a matrix. For example, they are made by exposing a sample of diamond (425–1700 micron) in a diamond and graphite matrix to high pressure-high temperature conditions (e.g., 50 Kbar at 1400° C. to 85 Kbar at 1800° C.).

A typical boron nitride reaction zone assembly (cell) is shown in FIG. 1, in which carbon heater tube 1 is surrounded by tantalum foil sleeve 2. The sample of pyrolytic boron nitride 3 is disposed between carbon discs 5, tantalum foil discs 4 and hot pressed boron nitride plugs 6.

The optical windows produced are capable of transmitting infrared light and visible light.

2 Claims, 3 Drawing Figures

PROCESS FOR MAKING DIAMOND AND CUBIC BORON NITRIDE COMPACTS

This application is a continuation of application Ser. No. 069,204 filed Aug. 23, 1979, now abandoned.

TECHNICAL FIELD

The field of this invention is optical windows for hostile environments. There is a need for erosion resistant windows for infrared detectors, lasers and space vehicles. Diamond and cubic boron nitride have advantages for such applications because of their optical transparency, high hardness, good abrasion resistance, high thermal conductivity and chemical inertness.

BACKGROUND

The application of diamond to windows in a laser is disclosed in U.S. Pat. No. 3,895,313. The use of very pure single crystal diamonds having a thermal conductivity of at least 10 w/cm°K. at 300° K. makes possible the transmission of more powerful laser beams than had been achieved with other known window materials, according to this patent. The windows mentioned therein can be flat or lense shaped, single crystal or mosaic (composed of a plurality of single crystals held together by a metal grid). Other applications mentioned in this patent are in microwave devices, reflectors, and interference filters.

A compact is a polycrystalline mass of abrasive particles (e.g., diamond and cubic boron nitride) bonded together to form an integral, tough, coherent, high-strength mass. Representative U.S. Pat. Nos. on the subject of diamond compacts are: 3,136,615 (boron carbide bonding medium); 3,141,746; 3,239,321 (graphite-free diamond compact); 3,744,982 (boron alloyed diamond compact process); 3,816,085; and 3,913,280. A composite compact is a compact bonded to a substrate material, such as cemented tungsten carbide (see U.S. Pat. No. 3,745,623). Representative U.S. Pat. Nos. on the subject of cubic boron nitride (CBN) compacts are: 3,233,988; 3,743,489 (aluminum alloy catalyst); 3,767,371 (composite) and 3,852,078 (uniform compacts of polycrystalline CBN with other hard materials (e.g., diamond). U.S. Pat. Nos. 3,831,428; 4,129,052 and 4,144,739 disclose wire drawing dies made from diamond or CBN. Cutting tools made with compacts are disclosed in U.S. Pat. No. 3,850,053.

The conversion of shock-formed wurtzitic boron nitride (WBN) to CBN compacts by high pressure-high temperature (HP/HT) processing is disclosed in U.S. Pat. No. 3,876,751; German Offenlegungschrift No. 2 235 240 and U.S. patent application Ser. No. 674,430 filed Apr. 7, 1976 now abandoned, which is incorporated by reference.

A process for directly converting pyrolytic boron nitride (PBN) to polycrystalline CBN in the absence of any catalyst such as those specified in U.S. Pat. No. 2,947,617 is described in U.S. Pat. No. 4,188,194. See also—F. R. Corrigan and F. P. Bundy, "Direct Transitions Among the Allotropic Forms of Boron Nitride at High Pressure and Temperatures", *The Journal of Chemical Physics*, Vol. 63, No. 9 Nov. 1, 1975).

A study of the erosion resistance of single crystal and polycrystalline diamond was presented at a conference given July 25-27, 1977, at the University of Colorado; Boulder, Colo., which is published in *High-Pressure Science and Technology*, Vol. 2, pp. 549–558, Ed. Timerhouse, KD and Barber, M.S., Plenum Press, New York. This paper mentions the optical window potential of diamond due to its broad transmittance band.

U.S. Pat. No. 3,829,544 mentions the possible use of white diamond compacts made without catalysts as heat sinks, solid state devices and optical devices.

U.S. Pat. No. 3,949,062, teaches the formation of polycrystalline diamond aggregates of predetermined shape.

The disadvantages of windows made from single crystal diamonds, as taught by U.S. Pat. No. 3,895,313, are the tendency of single crystals (both diamond and hard phase boron nitride) to shatter under impact loading and their scarcity and prohibitive cost in large sizes. The concept of using polycrystalline diamond or hard phase boron nitride is aimed at overcoming these disadvantages. Compacts (larger than most single crystal diamonds) are made from small crystal grains of varying sizes. Because compacts have grain boundaries, crack propagation is minimized in comparison to natural diamond which has weak planes of cleavage.

Although diamond compacts do not possess the maximum intrinsic hardness of single crystal diamond, because they are of less than full diamond density, they provide abrasion resistance equal to that of natural diamond. In hostile environments, at high velocities, abrasion resistance is an important factor. Optical windows in such environments must be able to withstand the abrasion of ice particles and water droplets at several times the speed of sound. Although such particle impacts individually last for microsecond time periods, they create repetitive high local stresses which can be severe.

DISCLOSURE OF INVENTION

This invention is summarized as an improvement in optical windows for adverse environments which comprises a window made of a single layer of a material selected from polycrystalline diamond and polycrystalline adamantine boron nitride. These may be thought of as compacts comprising a single layer of large crystals bonded in a polycrystalline matrix made of the same material as the large crystals. The term adamantine, as used herein refers to both the wurtzitic and cubic crystal forms of boron nitride (i.e., hard phase).

Of course, in order to function as an optical window a material must have a certain minimum characteristic light transmittance. For purposes of this disclosure light transmittance will refer to infrared light in certain specified wave lengths. It is understood that over a given wave length range, transmittance is variable, and there may be certain wave lengths at which absorbance occurs, giving a transmittance below that specified. Therefore, within this disclosure, when a certain transmittance is specified, it is for the majority of the wave length range, and a few dips below the specified transmittance of 20% are permitted.

Single phase CBN compacts, prepared by the direct conversion of PBN or WBN to CBN, and mixed CBN/WBN compacts, prepared by partial conversion of WBN to CBN, exhibit transmittance in the visible and near infrared regions of the electromagnetic spectrum.

If windows larger than the size of the compacts that can be made are needed, the compact could be incorporated into a mosaic type window having a metallic, ceramic, or other suitable matrix structure. One can also envision using compacts as a protective covering window (either flat or lense shaped, alone or in a mosaic structure) over a more conventional type window material which is not as abrasion or chemical resistant.

In the case of the adamantine boron nitride, it is not necessary that the window be made from a single layer of crystals (i.e., it need not have the thickness of one crystal).

BEST MODE FOR CARRYING OUT THE INVENTION

Figure 1:
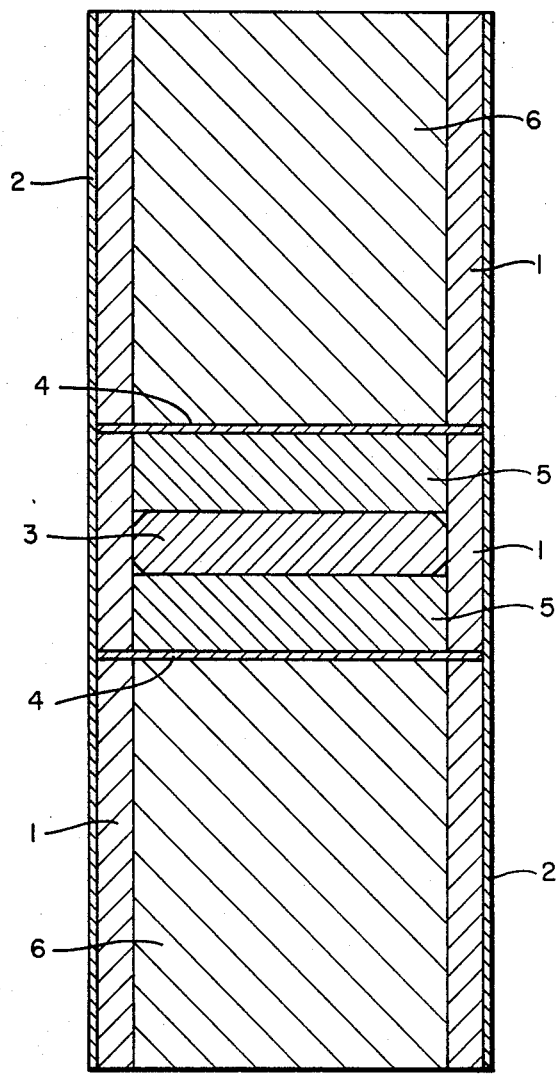
FIG. 1 illustrates, in section, a boron nitride reaction zone assembly (cell) for use within an HP/HT apparatus, such as those described in U.S. Pat. Nos. 2,947,611; 2,941,241 and 2,941,248.

In making the single layer diamond windows, utilization of relatively large (10–40 mesh, 1700–425 micron) diamonds is preferred. The single layer will result in straight-through light paths, and the catalyst/binder phase in the matrix would not interfere with transmittance.

In the case of single layer type CBN windows, it is preferable to use the largest crystal size available. Typical sizes would be 40–60 mesh (250–425 microns).

One preferred form of a HP/HT apparatus in which the compacts of this invention may be prepared is the subject of U.S. Pat. No. 2,941,248 (incorporated herein by reference) which is called a belt apparatus. It includes a pair of opposed cemented tungsten carbide punches and an intermediate belt or die member of the same material. The die member includes an aperture in which there is positioned a reaction vessel shaped to contain a reaction zone assembly. Between each punch and the die there is a gasket assembly comprising a pair of thermally insulating and electrically nonconducting pyrophyllite members and an intermediate metallic gasket.

The reaction vessel, in one preferred form, includes a hollow cylinder. The cylinder may be made of an inert material, such as salt, talc or lava, which (1) is not substantially converted during HP/HT operation to a stronger, stiffer state (as by phase transformation and/or compaction) and (2) is substantially free of volume discontinuities occuring under the application of high temperatures and pressures. Materials meeting other criteria set forth in U.S. Pat. No. 3,030,662 (Col. 1, 1.59–Col. 2, 1.2, incorporated by reference) are useful for preparing the cylinder.

Positioned concentrically within and adjacent to the cylinder is a graphite electrical resistance heater tube. Within the graphite heater tube, there is concentrically positioned a cylindrical inert liner (not used in directly converting PBN to CBN). The ends of the liner are fitted with inert plugs disposed at the top and the bottom.

Electrically conductive metal end discs are utilized at each end of the cylinder to provide electrical connection to the graphite heater tube. Adjacent to each disc is an end cap assembly each of which comprises a pyrophyllite plug or disc surrounded by an electrically conducting ring.

Operational techniques for simultaneously applying both high pressures and high temperatures in this type of apparatus are well known to those skilled in the super-pressure art. The reaction zone assembly fits within the space defined by the liner and the plugs. The reaction zone assembly consists of a cylindrical sleeve of shield metal selected from the group consisting of zirconium, titanium, tantalum, tungsten and molybdenum. Within the shield metal sleeve is a sub-assembly confined within a shield metal disc and a shield metal cup. The mass of abrasive grains (diamond or CBN) is disposed within the cavity defined by the cup and the disc. In the case of diamond, this mass may also contain graphite and/or a metal catalyst.

The balance of the volume in the reaction zone assembly may be taken up with the disc made of the same material as the cylinder (e.g., pyrophyllite) and discs made of hexagonal boron nitride to minimize the entry of undesirable substances into the sub-assembly defined by the shield metal disc and cup.

The conditions for the HP/HT process are:

For a diamond matrix:

Typical diamond particles used for the matrix may be in the range of 0.1 to 500 microns largest dimension;

Pressure temperature conditions within the diamond stable region and above the catalyst melting point. Typical conditions range from 50 to 85 Kbar at temperatures of 1400° C. to 1800° C. in the diamond stable region of the carbon phase diagram.

A reaction time of three to 60 minutes.

For CBN matrix:

Typical CBN particles used for the matrix may have a largest dimension of 0.1 to 20 microns;

Pressure of at least 45 Kbar at 1300° C. and within the CBN stable region; and

A reaction time of two to 60 minutes.

The diamond stable region is the range of pressure temperature conditions under which diamond is thermodynamically stable. On a pressure-temperature phase diagram, it is generally the high pressure side, above the equilibrium line between diamond and graphite.

The CBN stable region is the range of pressure temperature conditions under which CBN is thermodynamically stable. On a pressure-temperature phase diagram, it is generally the high pressure side, above the equilibrium line between CBN and hexagonal boron nitride.

The reaction zone assembly is loaded into the reaction vessel which is placed in the HP/HT belt apparatus. First, the pressure and then the temperature are increased and held at the desired conditions for sufficient time for sintering to occur. The sample is then allowed to cool under pressure for a short period of time, and finally the pressure is decreased to atmospheric pressure, and the compact is recovered.

The shield metal sleeve can be mechanically removed. Any adhering metal from the shield metal cup or disc can be ground or lapped off.

In the case of the adamantine boron nitride compact windows made by directly converting PBN to CBN, the reaction zone assembly is as illustrated in FIG. 1. The conditions for conversion are: pressure of at least 60 Kbar at a temperature of at least about 1800° C. and within the CBN stable region.

A carbon heater tube 1 is disposed inside and concentric to a shield metal sleeve 2. The shield metal sleeve prevents impurity penetration from exterior cell parts into the sample during HP/HT processing. The shield metal from which the sleeve is made is selected from the same group of refractory metals previously listed.

Within the cylinder defined by the carbon tube and the shield metal sleeve, are disposed the sample of PBN 3 and the other cell components. The sample has been beveled or rounded to relieve edge stress incurred during decompression of the cell and reduce the chance of compact cracking. In forming the window from such a compact, the beveled edge may be ground away if desired. The sample is protected above and below by shield metal discs 4 and carbon plugs 5 disposed between the upper and lower shield metal disc and the sample itself.

Figure 2:
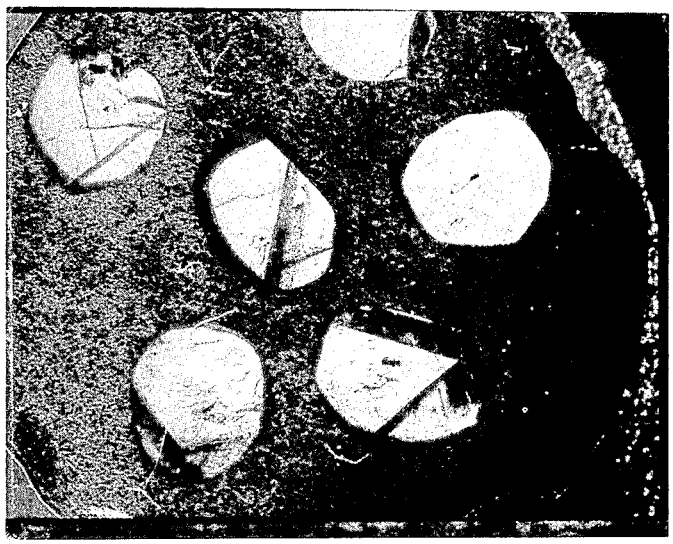
FIG. 2 is a photomicrograph (magnified 11.5×) showing a diamond compact of this invention made with 10 mesh (1.7 mm) natural diamond drill stones embedded in compartments in a graphite disc which has been converted to diamond by HP/HT processing.
Figure 3:
FIG. 3 is a photomicrograph (magnified 11.5×) showing a CBN compact optical window made from PBN converted to CBN.

The opposite ends of the reaction zone assembly are fitted with plugs 6 for transmitting pressure to the sample. The plugs are made of a refractory material which is an electrical insulator (e.g., hot-pressed boron nitride). More details on suitable cells for making adamantine boron nitride compacts can be found in U.S. Pat. No. 4,188,194 (see especially FIGS. 2 and 3).

Adamantine boron nitride compacts may be recovered from the reaction zone assembly by: (1) breaking off the ends of the cell comprising the end plugs; (2) mixing the remaining material with a mixture of sulfuric and nitric acids (e.g., 90:10 volume ratio sulfuric to nitric acid); (3) washing the undissolved solids in water; and (4) retrieving the compact disc.

After recovery, a compact to be used as an optical window is lapped, ground or polished with fine diamond powder either in bonded or loose form following conventional methods used to finish compacts, hard ceramics or cermets.

In the case of diamond compact windows, it is preferred that the relatively incompressible diamond crystals be isolated in a relatively compressible matrix before exposing the sample to HP/HT sintering conditions. This helps to reduce crystal flaws induced by unequal stresses applied during compact synthesis. This matrix could be a compressible form of carbon which would conform to the diamond crystal shapes and distribute the stresses evenly to the crystals. It could also be cobalt or cemented tungsten carbide powder.

A number of ways to do this are: (1) mixing diamond crystals with graphite, amorphous carbon, cobalt or cemented tungsten carbide powders; (2) mixing diamond crystals with a mixture of diamond (or CBN) and graphite or amorphous carbon powders (filler materials which are non-reactive at the HP/HT conditions used for compacts manufacture such as tungsten carbide, silicon nitride, or silicon carbide may be added to the carbon powders); (3) forming isolated compartments in a graphite block or disc for each diamond crystal; and (4) a combination of (1), (2), and (3).

The diamond plus carbon matrix is placed in a suitable high pressure device which can obtain diamond synthesis conditions. The graphite or amorphous carbon could be converted to diamond during sintering and, thus, introducing diamond-to-diamond bonding throughout the compact. A catalyst would normally be present to promote the conversion of the non-diamond carbon to diamond. Suitable catalysts are iron, nickel, or cobalt, or alloys of those metals with each other or other elements.

The invention will be further clarified by a consideration of the following examples, which are intended to be purely exemplary.

EXAMPLE I

HP/HT sintering runs were performed in accordance with the previous description, at 65 Kbar and 1600° C. All of the compacts were single crystal thickness layer diamond compacts made by the preferred technique which isolates the single diamond crystals in a compressible matrix. The other conditions of each run are detailed in Table 1. The compacts were ground to expose the diamond crystals.

Transmission measurements were made of the compacts on an infrared spectrophotometer. The range of percent infrared transmission through the compact samples over the infrared spectrum (wave length of 2.5 microns to 50 microns) is shown in Table 1. In each case, there were two dips in the transmission curve, one at wave lengths from about 4 to about 6 microns and the other at wave lengths from about 7 to about 10 microns. These represent the characteristic absorbance of Type-I diamond and have not been reflected in the numbers reported.

TABLE 1

| Sample | Compact Type | Run Conditions | | | Compact Thickness | Percent Transmittance Through Compact |
| | | Press Time (Min.) | Pressure (Kbar) | Temperature (°C.) | | |
| --- | --- | --- | --- | --- | --- | --- |
| SP-19 | 20/25 mesh diamond in powdered graphite & diamond fines (1-85 microns, peak at 30-45 microns) | 14.2 | 65 | 1600 | 0.36 mm | 20-30 |
| SP-20 | 10 mesh natural diamond drill stones in graphite disc with pockets (FIG. 2) | 15 | 65 | 1600 | 0.64 mm | 27-45 |
| SP-26 | 30/35 mesh diamond between 2 graphite discs | 15 | 65 | 1600 | 0.33 mm | 20-26 |
| SP-28 | 10 mesh natural diamond drill stones in powdered graphite and diamond fines | 15 | 65 | 1600 | 1.07 mm | 20-35 |

Sample SP-20, with the highest transmittance, was obtained by individually placing diamonds in preformed pockets in a graphite disc. This assured good separation and support of the diamonds during compression.

EXAMPLE II

A sample of PBN was filed into the shape of a disc to fit a cylindrical high pressure cell. The cell, shown in FIG. 1 with tantalum shield metal discs, was placed in a high pressure apparatus and compressed to 65 Kbar.

The sample was then heated by passing electric current through the cell. The heating was controlled by adjusting the power delivered to the cell. After heating for the 30 minutes, the power was turned off, and the sample cooled prior to relieving the pressure.

In carrying out the HP/HT direct conversion process for the preparation of CBN compact windows from PBN, it has been found that the microstructure of the CBN varies dependent on the HP/HT process conditions. CBN made at lower processing temperatures has a highly defective (small crystallite size) structure. With the PBN starting material, a gradual increase in crystallite size occurs with increasing temperature until temperatures in the region of about 2200° C. At this point crystallite size increased much more dramatically with increasing temperature. The CBN compact window of this example was prepared under conditions where larger crystallite size compacts are obtained, and these conditions are preferred.

Transmission measurements, similar to those of Example I, were made of the CBN compact window of this example. Over the wave length range of 2.5–3 microns, the transmittance was about 25%.

CBN windows made from directly converted PBN would be useful in microwave devices, because of low transmittance loss and high thermal conductivity (minimizing thermal shock).

Although compacts have been prepared in the form of flat discs, they could, if needed, be ground to a lense shape. Alternatively, it is possible by proper design of the high pressure cell, to prepare lense shaped compacts during the HP/HT processing. In the case of adamantine boron nitride, it is possible to pre-shape the PBN starting sample, taking into account the known axial length reduction during conversion, to produce a converted compact close to the lense shape desired. The void remaining in the cell between the rounded side of the PBN plug and one of the carbon discs would be conveniently filled by carbon powder. If WBN powder were the raw material for the cell, it could be placed in a lense shaped depression in a carbon plug within the cell. Formation of these lense shaped windows would reduce the cost of grinding required to obtain the desired lense geometry.

The improved compact windows described herein may also be used to provide impact protection to conventional ceramic window materials (e.g., silicon nitride or silicon carbide). In this modification, the diamond or adamantine boron nitride window would be formed as described above, except that the sample would be in direct contact with a particulate mass of the desired ceramic within the reaction zone assembly. The conditions for sintering diamond, CBN and ceramics are compatible; so, one process the two particulates would be sintered together giving an ideal bond with no voids on the interface to cause shock wave reflections. This technique would not be applicable to CBN from directly converted PBN because some ceramics may interfere with the direct conversion.

The adamantine boron nitride or diamond compacts described herein may also be used as high energy mirrors. Reflectors, in such devices as lasers, which handle a highly amplified energy beam, can be limiting factors to the power density of the apparatus. Such a reflector is made by mounting a reflecting layer on one of the improved diamond or adamantine boron nitride compacts disclosed herein. The adamantine boron nitride may be made by directly converting wurtzitic boron nitride, hexagonal boron nitride or mixtures thereof without the aid of catalysts.

High reflectivity metals, such as silver, can be applied best by sputtering or evaporation using conventional techniques. See Dushman S., *Scientific Foundation of Vacuum Techniques,* 2nd ed., 1966, John Wiley & Sons, Inc., N.Y. pp. 704–710 and Holland, L., Chapman, & Hall, *The Vacuum Deposition of Thin Films,* 1st ed., 1956, John Wiley & Sons, Inc.

In reflectors, the high thermal diffusivity of diamond or adamantine boron nitride is advantageous. It enables the rapid transfer of heat away from the reflecting metal surface which would otherwise be damaged.

To concentrate laser energy, concave mirrors are used. Adamantine boron nitride is advantageous for this purpose because it can be polished to the needed very high precision with diamond powder. Adamantine boron nitride does not have vector hardness variations which diamond has, hence a polycrystalline adamantine boron nitride curved mirror can be polished on a micro scale to the accuracy needed. Whereas, this would be difficult if not impossible if the curved mirror were made of polycrystalline diamond.

For flat reflectors of small diameter beams of laser energy, diamond compacts could be used wherein only one crystal of the diamond compact is illuminated by the laser energy and hence could be polished to the needed degree of flatness. The single crystal of diamond would be in a mosaic of diamond crystals, like a diamond compact. This design would have higher thermal diffusivity than single crystal diamond in a mosaic as taught by the prior art of the Seitz U.S. Pat. No. 3,895,313.

It is understood that ultimately the heat dissipated into the adamantine boron nitride or diamond of the compact reflector would be transferred to a conventional heat transfer medium, such as water in cooling coils or a cooling gas. Various embodiments for cooling may be seen in the Seitz patent, FIGS. 7–20 and Col. 8, l. 22–Col. 11, l. 13, hereby incorporated by reference.

Other embodiments of the invention will be apparent to those skilled in the art from a consideration of this specification or practice of the invention disclosed herein. It is not intended that the invention be limited to the disclosed embodiments or to the details thereof, and departures may be made therefrom within the spirit and scope of the invention as defined in the following claims.

We claim:

1. An improved optical window for adverse environments wherein the improvement comprises a window consisting essentially of a single layer of large diamond crystals from 425 to 1700 microns in largest dimension bonded in a polycrystalline matrix made of the same material as the large crystals, said window having a light transmittance of at least 20% for infrared light at wave lengths of up to 50 microns.

2. The improved optical window as recited in claim 1 wherein the window is made of polycrystalline diamond which has been made by sintering single diamond crystals in a compressible matrix whereby crystal flaws are reduced.

* * * * *